(12) United States Patent
Schuft et al.

(10) Patent No.: US 11,363,895 B2
(45) Date of Patent: Jun. 21, 2022

(54) ADJUSTABLE SECURITY BRACKET FOR PRODUCTS OF MULTIPLE DIMENSIONS

(71) Applicant: Mobile Tech. Inc., Hillsboro, OR (US)

(72) Inventors: Peter Schuft, Portland, OR (US); Eric Charlesworth, Hillsboro, OR (US)

(73) Assignee: Mobile Tech, Inc., Hillsboro, OR (US)

( * ) Notice: Subject to any disclaimer, the term of this patent is extended or adjusted under 35 U.S.C. 154(b) by 0 days.

(21) Appl. No.: 17/154,664

(22) Filed: Jan. 21, 2021

(65) Prior Publication Data

US 2021/0228000 A1 Jul. 29, 2021

Related U.S. Application Data

(60) Provisional application No. 62/965,545, filed on Jan. 24, 2020.

(51) Int. Cl.
*A47F 7/024* (2006.01)
*F16M 11/04* (2006.01)
*E05B 73/00* (2006.01)
*F16M 13/02* (2006.01)

(52) U.S. Cl.
CPC ............ *A47F 7/0246* (2013.01); *E05B 73/00* (2013.01); *E05B 73/0017* (2013.01); *F16M 11/041* (2013.01); *F16M 13/02* (2013.01)

(58) Field of Classification Search
CPC .... E05B 73/0082; E05B 73/00; A47F 7/0246; A47F 7/024
See application file for complete search history.

(56) References Cited

U.S. PATENT DOCUMENTS

| 5,595,074 | A | * | 1/1997 | Munro | E05B 73/0082 |
| | | | | | 248/551 |
| 8,711,553 | B2 | * | 4/2014 | Trinh | F16M 11/041 |
| | | | | | 361/679.02 |
| 9,334,679 | B2 | * | 5/2016 | Lin | F16M 13/00 |
| 9,786,140 | B2 | * | 10/2017 | Henson | G08B 25/10 |
| 9,797,543 | B2 | * | 10/2017 | Lin | E05B 73/0082 |
| 10,448,759 | B1 | * | 10/2019 | Chapuis | A47F 5/16 |
| 10,858,865 | B2 | * | 12/2020 | Kelsch | E05B 73/0017 |
| 11,122,917 | B2 | * | 9/2021 | Chapuis | A47F 5/10 |
| 2010/0079285 | A1 | * | 4/2010 | Fawcett | G08B 13/149 |
| | | | | | 340/568.1 |
| 2015/0050077 | A1 | * | 2/2015 | Huang | F16M 11/041 |
| | | | | | 403/322.1 |

(Continued)

*Primary Examiner* — Bradley Duckworth
(74) *Attorney, Agent, or Firm* — Olympic Patent Works PLLC

(57) ABSTRACT

Systems and methods are directed to securing products to product display assemblies. In one aspect, a product display assembly includes an adjustable bracket for securing a product. The adjustable bracket for securing a product comprises a first bracket arm, a second bracket arm, and a base comprising a top plate, a bottom plate, a gear located between the top plate and the bottom plate, and a lock that is controllable between a locked state and an unlocked state. The first and second bracket arms extend laterally outward from opposite sides of the base. The gear is located between the top plate bottom surface and the bottom plate top surface. The lock compresses the top plate and the bottom plate together to restrict extension of the first and second bracket arms relative to the base.

19 Claims, 11 Drawing Sheets

(56) References Cited

U.S. PATENT DOCUMENTS

| | | | |
|---|---|---|---|
| 2015/0060624 A1* | 3/2015 | Huang | F16M 13/00 248/316.4 |
| 2015/0313026 A1* | 10/2015 | Yu | F16M 11/041 248/285.1 |
| 2016/0201359 A1* | 7/2016 | Berglund | G08B 13/1472 70/58 |
| 2021/0230910 A1* | 7/2021 | Schuft | E05B 73/00 |

* cited by examiner

ADJUSTABLE SECURITY BRACKET FOR PRODUCTS OF MULTIPLE DIMENSIONS

CROSS-REFERENCE TO RELATED APPLICATION

This application claims the benefit of Provisional Application No. 62/965,545, filed Jan. 24, 2020.

TECHNICAL FIELD

The present disclosure is directed to secure product merchandising systems.

BACKGROUND

Selling products in a retail setting is a balance between a seller's desire to create customer interest in products on display by allowing customers to inspect and handle the products and the seller's need to ensure that the products are not stolen. Retail sales of small electronic devices, such as cell phones, tablets, cameras, and wearable electronics, are often placed on display tables in large open retail settings, enabling customers an opportunity to inspect many different models by simply walking from table to table. However, because these products can be easily concealed and stolen in a crowded open retail setting, products are secured to display tables using merchandising systems that are constructed to prevent theft of the products on display. A typical merchandising system comprises a puck and a base secured to a display table or shelf. A product is attached to the puck with a security bracket and a tether connects the puck to a self-winding reel located within the base. When a customer lifts a product to examine the product's features, the product is held under tension by the self-winding reel.

Retailers have relied on typical merchandising systems to deter theft of the attached products. However, there is no industry size standard for electronic products in many categories. Smart phones, for example, have a generally rectangular design, but the exact dimensions of the phone, touchscreen, and visible display varies greatly between manufacturers. As a result, conventional security brackets are often not adjustable to accommodate the myriad of potentially different sizes and shapes for products. Conventional security brackets often require multiple adjustments to fit a product. Each bracket arm needs to be adjusted individually and multiple connectors need to be adjusted to lock the brackets. Evan after all the adjustments the product may not be centered in the bracket, which adversely affects the aesthetics of a merchandising display of the product. To unlock a product, users must interact with multiple connectors so that the bracket's arms can be extended to remove a product. Thus, there is a need for security brackets that provide a high degree of mechanical security for a wide range of product dimensions and designs and resist attacks by thieves.

DETAILED DESCRIPTION

Figure 1:
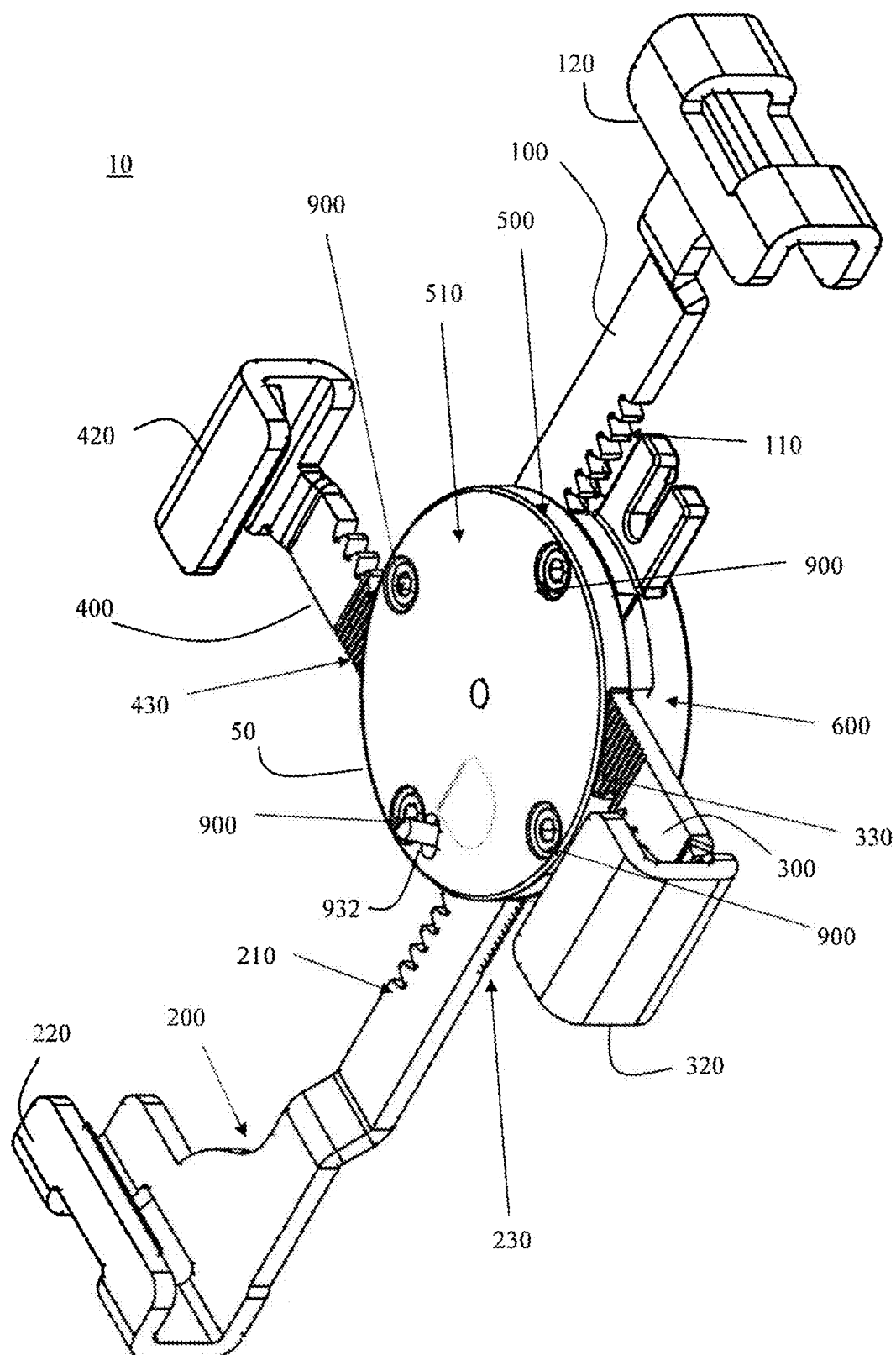
FIG. 1 shows an isometric view of an example bracket.
Figure 2:
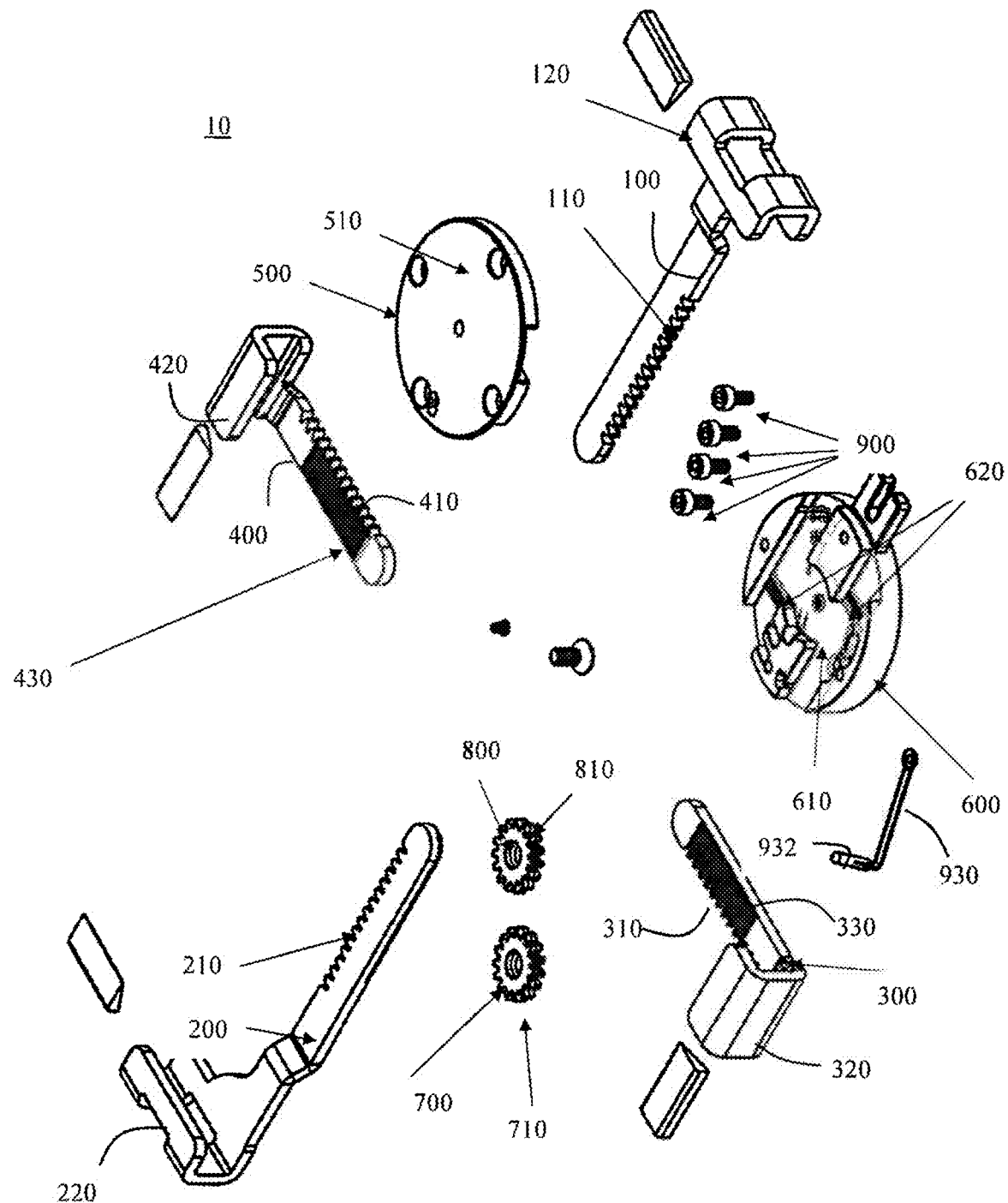
FIG. 2 shows an exploded view of an example bracket

FIG. 1 shows an example embodiment of an adjustable bracket 10 for securing a product. FIG. 2 shows an exploded view of the same adjustable bracket 10. The adjustable bracket 10 has a first bracket arm 100 and a second bracket arm 200. The adjustable bracket 10 may include a third bracket arm 300 and a fourth bracket arm 400. Bracket arms 100, 200, 300, and 400 include portions that extend laterally outwardly from a base 50 as shown in FIG. 1. First bracket arm 100 and second bracket arm 200 can extend laterally outward from opposite sides of the base 50. Similarly, third bracket arm 300 and fourth bracket arm 400 can extend laterally outward from opposite sides of the base 50. The first and second bracket arms 100 and 200 can be perpendicular to the third and fourth bracket arms 300 and 400. In this fashion, the first and second bracket arms 100, 200 can be used for fitting onto a product along a first product dimension, while the third and fourth bracket arms 300, 400 can be used for fitting onto the product along a second product dimension that is perpendicular to the first product dimension. While FIG. 1 shows base 50 as exhibiting a disk shape, base 50 is not limited to a disk shape. Base 50 could exhibit different shapes, such as a square or rectangular shape.

For a frame of reference in the discussions below with respect to various components of the disclosed example embodiments for a bracket 10, terms such as "upper", "top". "higher", "upward", and the like will refer to a directional relationship that is toward the surface 510 of the base 50 on which a product is mounted, while terms such as "lower". "bottom", "downward", and the like will refer to a directional relationship that is opposite this mounting surface 510. Length, height, and/or thickness would thus refer to the dimension from an upper portion to a lower portion, and width would refer to the lateral dimension that is orthogonal to the length dimension. Similarly. "vertical" refers to the length, height, and/or thickness dimension for a bracket 10 and "horizontal" refers to the width dimension for the bracket 10.

The first bracket arm 100 may comprise a plurality of first bracket arm teeth 110. Similarly, the second bracket arm 200 may comprise a plurality of second bracket arm teeth 210, the third bracket arm 300 may comprise a plurality of third bracket arm teeth 310, and the fourth bracket arm 400 may comprise a plurality of fourth bracket arm teeth 410. These teeth 110, 210, 310, 410 may be located on inner portions of their respective bracket arms 100, 200, 300, 400 that are proximal with respect to base 50.

The first bracket arm 100 may comprise a first retention member 120 or the like on an outer portion that is shaped to engage with an edge or other component of the product to be secured by the bracket 10. Similarly, the second bracket arm 200 may comprise a second retention member 220 or the like on an outer portion that is shaped to engage with another edge or other component of the product to be secured by the bracket 10, the third bracket arm 300 may comprise a third retention member 320 or the like on an outer portion that is shaped to engage with yet another edge or other component of the product to be secured by the bracket 10, and the fourth bracket arm 400 may comprise a fourth retention member 420 or the like on an outer portion that is shaped to engage with still another edge or other component of the product to be secured by the bracket 10. In the example of FIG. 1, these retention members 120, 220, 320, 420 exhibit a U-shape or the like at the distal ends of their respective bracket arms 100, 200, 300, and 400 with respect to the base. The U-shape restricts not only lateral movement of the product fitted into the bracket 10 but also prevents vertical/upward movement of the product out of the bracket 10.

The first and second bracket arms 100, 200 can serve as a first pair of bracket arms for securing a product along a first dimension of the product. The third and fourth bracket arms 300, 400 can serve as a second pair of bracket arms for securing a product along a second dimension of the product, where the second dimension is perpendicular to the first dimension. Bracket arms 100, 200 can exhibit the same dimensions as each other (albeit mirrored with respect to the locations of teeth 110, 210). The positions of the retention members 120, 220 are located opposite one another as shown by FIGS. 1 and 2. Bracket arms 300, 400 can exhibit the same dimensions as each other (albeit mirrored with respect to the locations of teeth 310, 410). The positions of the retention members 320, 420 are located opposite one another as shown in FIGS. 1 and 2. The first pair of bracket arms 100 and 200 may be longer than the second pair of bracket arms 300 and 400 to secure rectangular products. An example of this is shown in FIGS. 1 and 2, where bracket arms 300, 400 are shorter than bracket arms 100, 200.

FIGS. 1 and 2 show that the third and fourth bracket arms 300, 400 include corrugated surfaces 330, 430, respectively. As shown in FIGS. 1 and 2, the corrugated surfaces 330, 430 comprise a series of parallel ridges and grooves located on a top surface of the bracket arms 330, 430, respectively, to provide a ridged surface for engagement with a complementary corrugated surface on a bottom surface of top plate 500 as discussed below with respect to an example locking mechanism. The corrugated surfaces 330, 430 need not extend along the full length of the top surfaces of bracket arms 300, 400. For example, the corrugated surfaces 330, 430 are located in the top surfaces of the bracket arms 300, 400 within the borders of top plate 500. The bottom surfaces of first and second bracket arms 100 and 200 can also include corrugated surfaces 130 and 230, respectively (see FIG. 3). However, with the example of FIG. 1, the corrugated surfaces 130 and 230 provide a ridged surface for engagement with a complementary corrugated surface on a top surface of bottom plate 600 as discussed below with respect to an example locking mechanism. The corrugated surfaces 130, 230, 330, 430 provide a locking and/or friction effect that restricts adjustment of the bracket arms 100, 200, 300, 400 when a lock for the bracket 10 is placed in a locked state.

The base 50 may comprise a top plate 500 and a bottom plate 600. The top plate 500 has a top plate top surface 510 and a top plate bottom surface 520. The top plate top surface 510 of top plate 500 serves as the surface on which a product (such as a smart phone, tablet computer, etc.) can be mounted when the product is secured by the bracket 10. As discussed below, the product may be automatically centered via the bracket arms 100, 200, 300, 400 onto the top plate top surface 510 as a result of an automatic centering function that the bracket 10 can provide, as discussed below. The bottom plate 600 has a bottom plate top surface 610. In some embodiments, the top plate bottom surface 520 may have ridges 530 (see FIG. 5) that can serve as the complementary ridged surface for engaging and interlocking with ridges of corrugated surfaces 330, 430 of bracket arms 300, 400; and the bottom plate top surface 610 may have ridges 620 (see FIG. 4) that can serve as the complementary ridged surface for engaging and interlocking with ridges of corrugated surfaces 130, 230 of bracket arms 100, 200. Ridges 530 can be included on portions of the top plate bottom surface 520 that define channels 540 (see FIG. 5) for receiving the bracket arms 300, 400. Ridges 630 can be included on portions of the bottom plate top surface 610 that define channels 640 (see FIG. 4) for receiving the bracket arms 100, 200. The top plate 500 and bottom plate 600 can be connected to each other via a plurality of fasteners 900 (e.g., threaded screws, bolts, etc.) (see FIG. 2) that pass through corresponding holes of the top and bottom plates 500, 600.

As shown in the exploded view of FIG. 2, the bracket 10 includes a first gear 700, which may have a plurality of first gear teeth 710, and a second gear 800, which may have a plurality of second gear teeth 810. As described in further detail below, a plurality of the first gear teeth 710 will engage and interlock with a plurality of the first bracket arm teeth 110 and a plurality of the second bracket arm teeth 210 so that rotation of the first gear 700 drives the first and second bracket arms 100 and 200 laterally outward (extension) or laterally inward (retraction) based on the direction of rotation for the first gear 700. Similarly, and as described in further detail below, a plurality of the second gear teeth 810 will engage and interlock with a plurality of the third bracket arm teeth 310 and a plurality of the fourth bracket arm teeth 410 so that rotation of the second gear 800 drives the third and fourth bracket arms 300 and 400 laterally outward (extension) or laterally inward (retraction) based on the direction of rotation for the second gear 800

Figure 4:
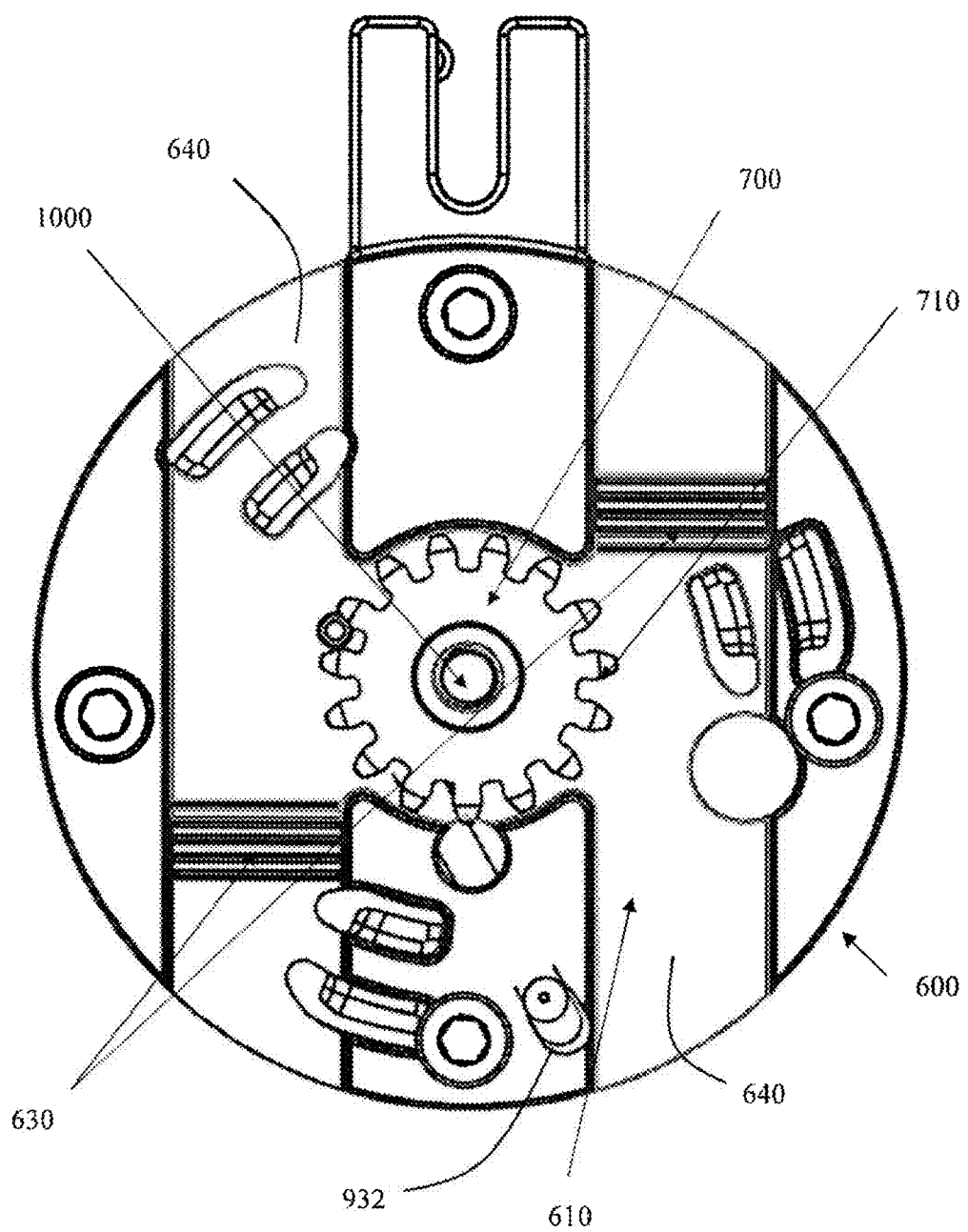
FIG. 4 shows a top view of an example bracket with various components removed to show the internal components of the bracket.
Figure 5:
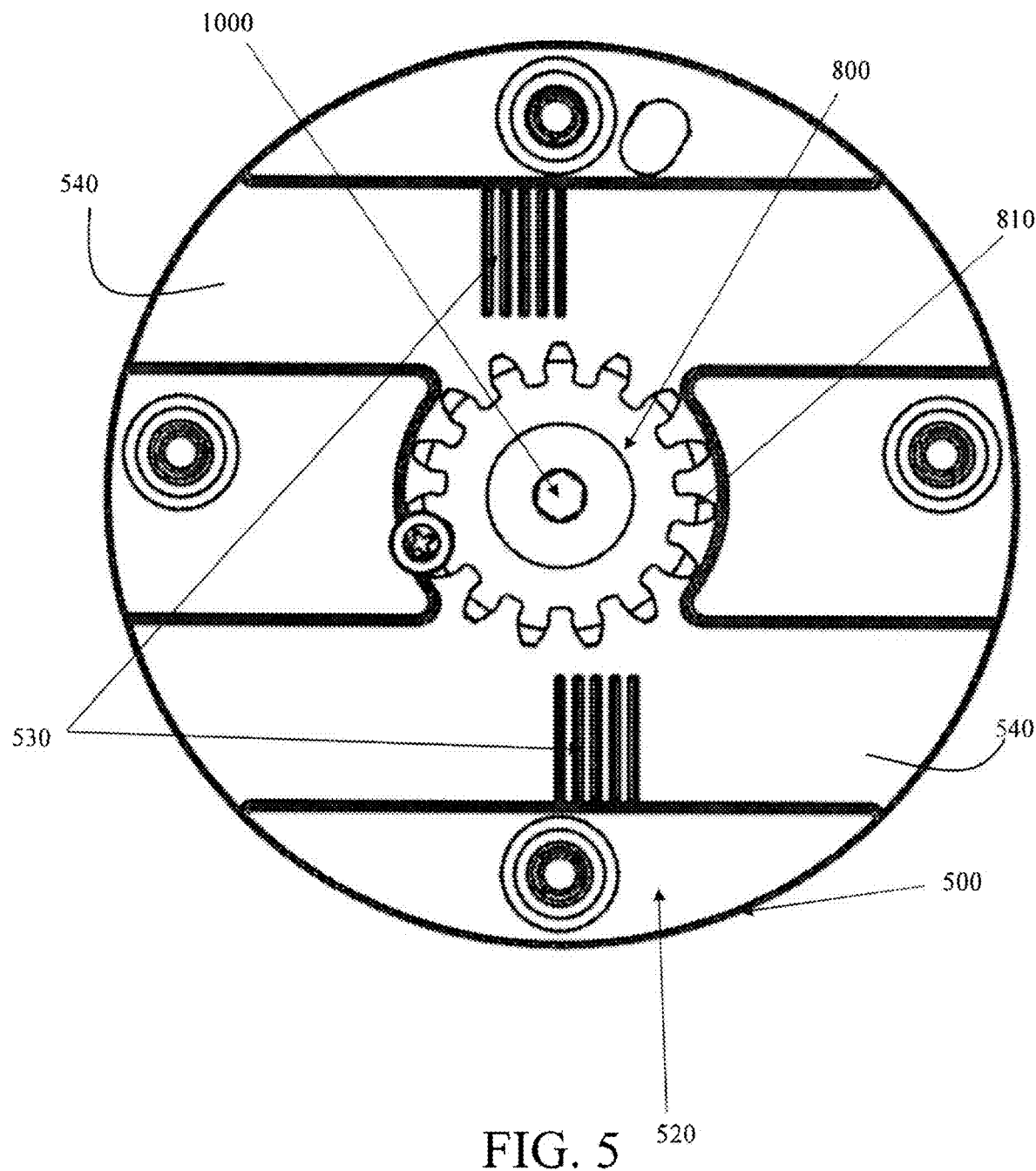
FIG. 5 shows a bottom view of an example bracket with various components removed to show the internal components of the bracket.

The first gear 700 and second gear 800 are located between the top plate bottom surface 520 and the bottom plate top surface 610. First gear 700 can be located in a central recess of the top plate bottom surface 520 as shown by FIG. 5. Second gear 800 can be located in a central recess of the bottom plate top surface 610 as shown by FIG. 4. First gear 700 and second gear 800 can be a stacked orientation (with gear 700 below gear 800), where gears 700 and 800 share the same axis of rotation. Gears 700 and 800 can be rotatable around one or more spindles which can be included on the top plate 500 and/or bottom plate 600. Furthermore, in an example embodiment, gears 700 and 800 can share the same diameter and share the same spacing between their respective gear teeth. The teeth of bracket arms 100, 200, 300, 400 can be located on the side of their respective bracket arms that face the first and second gears 700, 800 when the bracket arms are positioned in channels 540, 640. Consequently, the first bracket arm 100 and the second bracket arm 200 are located between the top plate bottom surface 520 and the bottom plate top surface 610 such that the first bracket arm teeth 110 and second bracket arm teeth 210 face gear teeth 710 when bracket arms 100, 200 are positioned in channels 640. Similarly, the third bracket arm 300 and the fourth bracket arm 400 are located between the top plate bottom surface 520 and the bottom plate top surface 610 such that the third bracket arm teeth 310 and fourth bracket arm teeth 410 face gear teeth 810 when bracket arms 300, 400 are positioned in channels 540. Accordingly, the first and second bracket arms 100 and 200 are located closer to the bottom plate top surface 610, and the third and fourth bracket arms 300 and 400 are located closer to the top plate bottom surface 520.

The bracket 10 comprises a lock 1000. The lock 1000 is controllable between a locked state and an unlocked state, where the lock 1000 prevents extension/retraction of bracket arms 100, 200, 300, 400 when in the locked state, and wherein the lock 1000 permits extension/retraction of bracket arms 100, 200, 300, 400 when in the unlocked state.

In some embodiments, the lock 1000 may comprise a tension lock that prevents extension/retraction of bracket arms 100, 200, 300, 400 when in the locked state by compressing the top plate bottom surface 520 and the bottom plate top surface 610 in a manner that prevents rotation of gears 700 and 800. Without rotation of gears 700, 800, the gear teeth will prevent extension/retraction of the bracket arms 100, 200, 300, 400 via engagement with the bracket teeth 110, 210, 310, 410. As an example, the compression action of the plates 500, 600 can bring portions of the top plate bottom surface 520 and the bottom plate top surface 610 into engagement with gears 800 and 700 in a manner that prevents their rotation, while relative movement of the plates 500, 600 to a decompressed position can free the gears for rotation.

In other embodiments, the lock 1000 may comprise a tension lock that prevents extension/retraction of bracket arms 100, 200, 300, 400 when in the locked state by compressing the second plurality of grooves 620 of bottom plate top surface 610 in a manner where (1) the ridges of corrugated surfaces 120, 220 of bracket arms 100, 200 engage with ridges 630 of bottom plate top surface 610 and (2) the ridges of corrugated surfaces 320, 420 of bracket arms 300, 400 engage with ridges 530 of top plate bottom surface 520. The engagement of these ridged surfaces can resist pulling and/or pushing forces on the bracket arms 100, 200, 300, 400. Because the various bracket arms are incapable of movement, the gears 700 and 800 are likewise blocked from rotation by virtue of the engagement between the teeth of the locked bracket arms and the gear teeth.

The tension lock can include any of a number of mechanisms for compressing the top and bottom plates 500, 600 against each other. For example, a tensioning screw can be included in the base 50 where rotation of the tensioning screw in a first direction (e.g., clockwise) can cause a tightening that presses the top and bottom plates 500, 600 against each other, and where rotation of the tensioning screw in a second direction (e.g., counterclockwise) can cause a loosening that permits vertical separation of the top and bottom plates 500, 600 relative to each other. In this way, the top and bottom plates 500, 600 can serve as a vice that clamps down on the bracket arms 100, 200, 300, 400 to create the engagement between corresponding corrugated surfaces of the bracket arms and plates. The base 50 can be provide access to the lock 1000 via an interface on a bottom surface of the base 50. For example, the interface on the bottom surface of base 50 can be shaped to receive a tool that permits a user to apply rotational force to the tensioning screw. Accordingly, lock 1000 can be controlled from a single point on the bracket 10 so that all bracket arms 100, 200, 300, 400 can be made adjustable in response to a first action taken on the lock 1000 via the single interface and all bracket arms 100, 200, 300, and 400 can be locked into place in response to a second action taken on the lock 100 via the single interface.

The bracket arms 100, 200, 300, 400, top and bottom plates 500, 600, and lock 1000 can be formed from metal to provide suitable strength and durability. For example, the metal may be stainless steel or other suitable high strength metals. Gears 700 and 800 can be formed from high strength metals as well.

Figure 3:
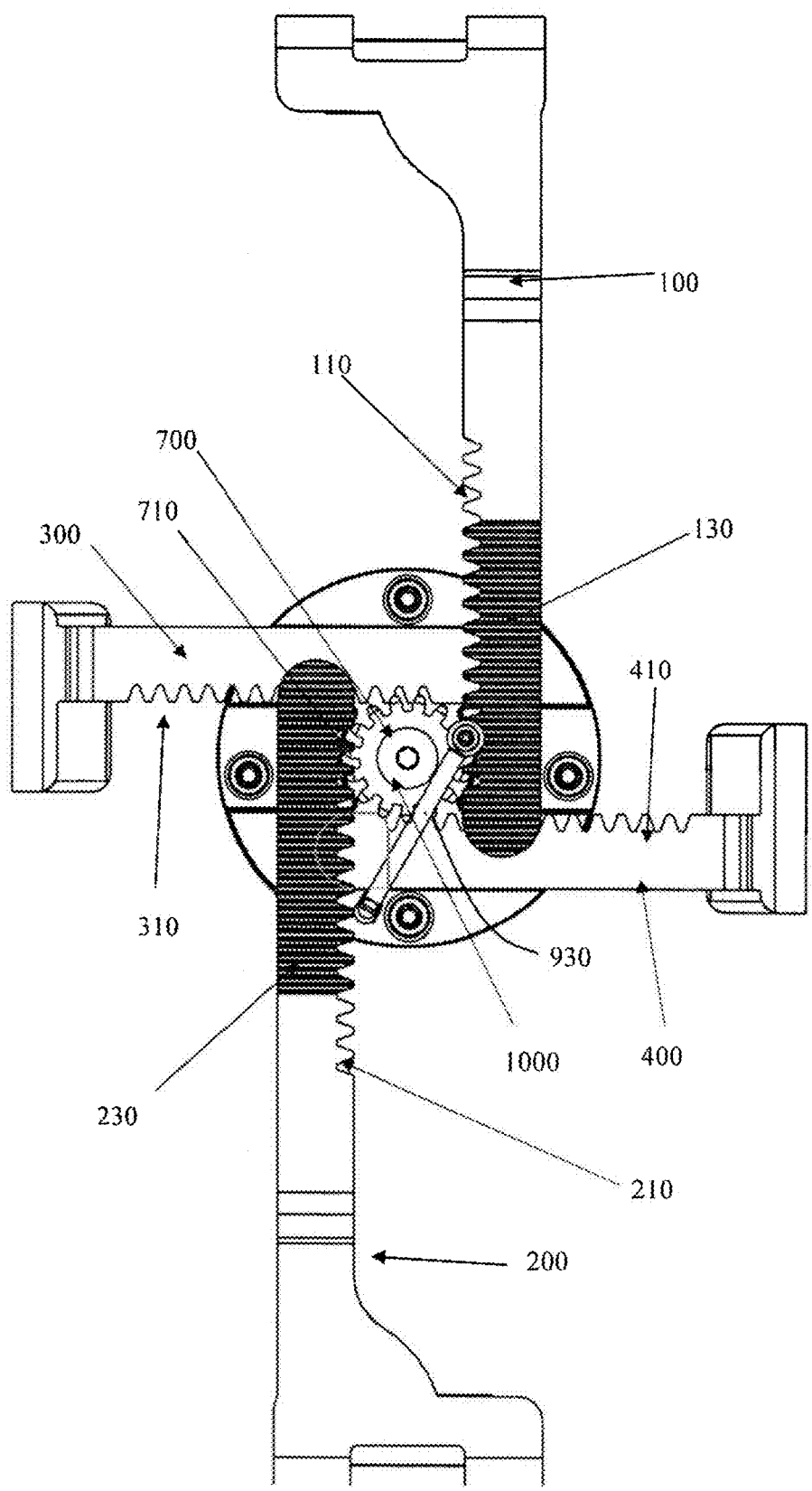
FIG. 3 shows a bottom view of an example bracket with various components removed to show the internal components of the bracket.

FIG. 3 shows an example bottom view of the bracket 10 with the bottom plate 600 removed to show the internal components of the bracket 10. In this view, bottom plate 600 has been removed and gear 700 can be viewed. In this view, a plurality of the gear teeth 710 of gear 700 can be seen engaging with a plurality of the first bracket arm teeth 110 and a plurality of the second bracket arm teeth 210. When gear 700 is rotated in a first direction, the first bracket arm 100 and the second bracket arm 200 are extended. Similarly, when gear 700 is rotated in a second direction, which is opposite of the first direction, the first bracket arm 100 and the second bracket arm 200 are retracted. For example, counterclockwise rotation of gear 700 can drive extension of the bracket arms 100 and 200; and clockwise rotation of gear 700 can drive retraction of the bracket arms 100 and 200.

Though not shown by the view of FIG. 3, the gear 800 interacts similarly with the third bracket arm 300 and the fourth bracket arm 400 (e.g., where counterclockwise rotation of gear 800 drives extension of the bracket arms 300 and 400; and clockwise rotation of gear 800 drives retraction of the bracket arms 300 and 400.

Because bracket arms 100 and 200 engage with opposite sides of gear 700, where the bracket arm teeth 110, 210 share the same dimensions, bracket arms 100 and 200 can extend/retract as a tandem pair in that rotation of the gear 700 will cause bracket arm 100 and bracket arm 200 to move by the same distance in opposite directions. Moreover, because bracket arms 100, 200 share the same lateral extent, bracket arms 100 and 200 are auto-centered with respect to the center of the base 50. Similarly, because bracket arms 300 and 400 engage with opposite sides of gear 800, where the bracket arm teeth 310, 410 share the same dimensions, bracket arms 300 and 400 can extend/retract as a tandem pair in that rotation of gear 800 cause bracket arm 300 and bracket arm 400 to move by the same distance. Moreover, because bracket arms 300, 400 share the same lateral extent, bracket arms 300, 400 are auto-centered with respect to the center of the base 50. This provides for efficient and effective bracketing of products that have predominantly square or rectangular shapes (such as smart phones). This allows for an automatic centering function of the bracket 10, where the retraction of the bracket arms 100, 200, 300, 400 to fit onto a product will automatically center that product over base 50 of the bracket 10.

Furthermore, because gears 700 and 800 are capable or rotating independent of each other, the bracket 10 can be adjusted to fit products of many different dimensions. For example, a smart phone with dimensions of 2 inches by 6 inches can be secured, as can a smart phone with dimensions of 2 inches by 5 inches (as can a smart phone with dimensions of 1.8 inches by 4.5 inches, etc.). To fit the bracket 10 onto a given product, the lock 1000 can be switched to an unlocked state. With the lock 1000 unlocked, a first pulling force can be applied to the bracket arm 100 or bracket arm 200 to extend bracket arms 100 and 200 to accommodate a dimension larger than a first dimension of the subject product, and a second pulling force can be applied to the bracket arm 300 or bracket arm 400 to extend bracket arms 300 and 400 to accommodate a dimension larger than a second dimension of the subject product. At this point, the product can be placed on top plate top surface 510. With the product in place, a first pushing force can be applied to the bracket arm 100 or bracket arm 200 to retract bracket arms 100 and 200 to snugly fit the first dimension of the subject product, and a second pushing force can be applied to the bracket arm 300 or bracket arm 400 to retract bracket arms 300 and 400 to snugly fit the second dimension of the subject product. With the bracket arms snugly fit onto the subject product (where the product can be automatically centered on base 50 by virtue of relationships between gears 700 and 800 and bracket arms 100, 200, 300, 400 as noted above), the lock 1000 can then be actuated to switch it to a locked state. With lock 1000 is in the locked state, further extensions of the bracket arms 100, 200, 300, 400 is restricted and the product is thus secured by the bracket 10. Accordingly, the bracket 10 only requires pulling/pulling forces on one of bracket arms 100, 200 to adjust both bracket arms 100, 200; and bracket 10 only requires pulling/pulling forces on one of bracket arms 300, 400 to adjust both bracket arms 300, 400.

Figure 6:
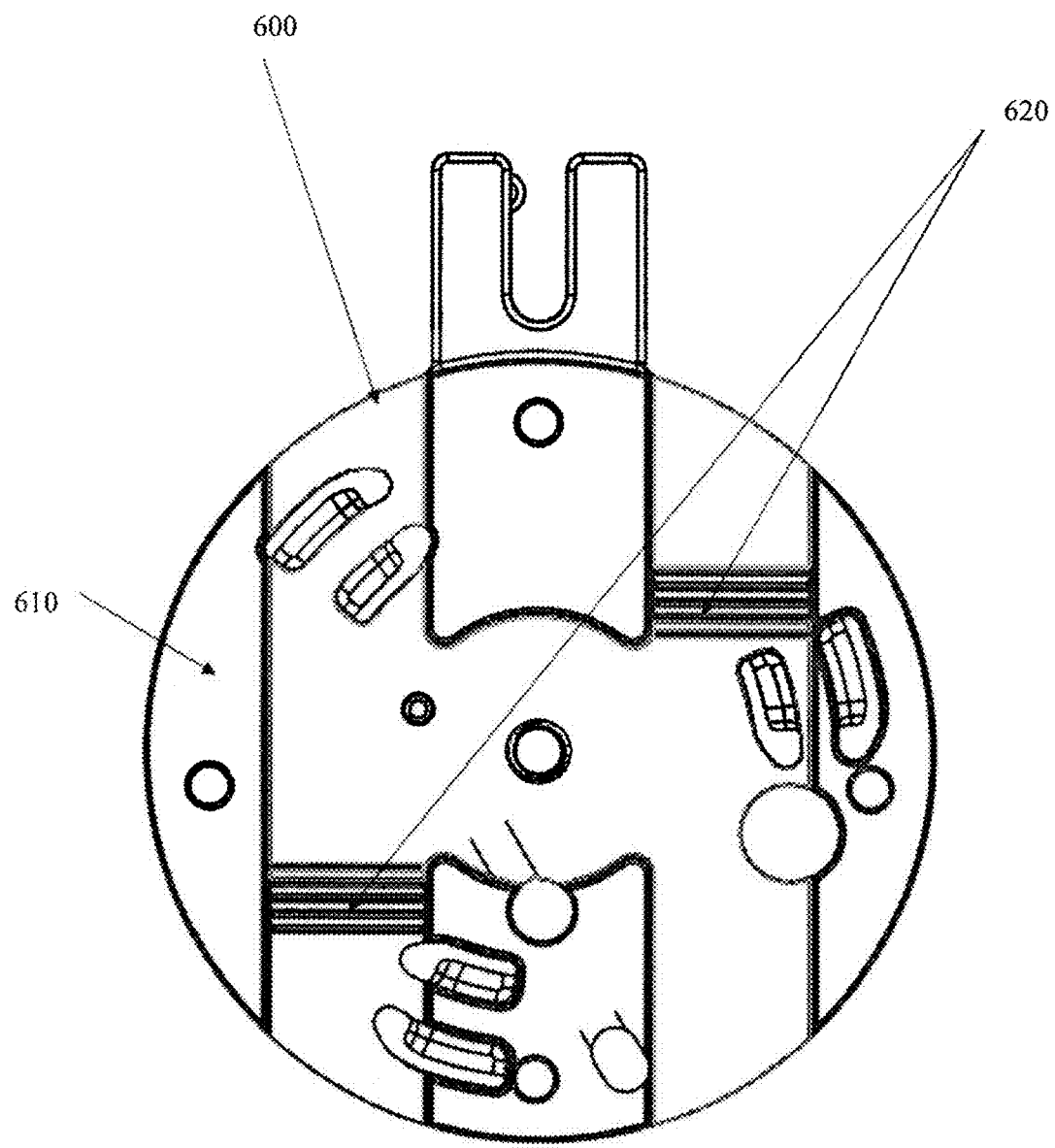
FIG. 6 shows a close-up view of the bottom plate top surface.

FIG. 4 shows a top view of bracket 10 with various components removed to show the internal components of the bracket 10. In the view of FIG. 4, top plate 500, first bracket arm 100, second bracket arm 200, third bracket arm 300, fourth bracket arm 400, and second gear 800 have been removed. Bottom plate 600 and gear 700 are visible. As shown, the axis of rotation for gear 700 is located on the center point of bottom plate 600. FIG. 4 also shows the ridges 630 that are included within channels 640 for engaging with corresponding ridges of corrugated surfaces 130, 230 of bracket arms 100, 200 when the lock 1000 is in the locked state. FIG. 6 shows a top view of bottom plate 600 with gear 700 removed. In the view of FIG. 6, the central recess of the bottom plate top surface 610 in which gear 700 can be nested is seen.

Figure 7:
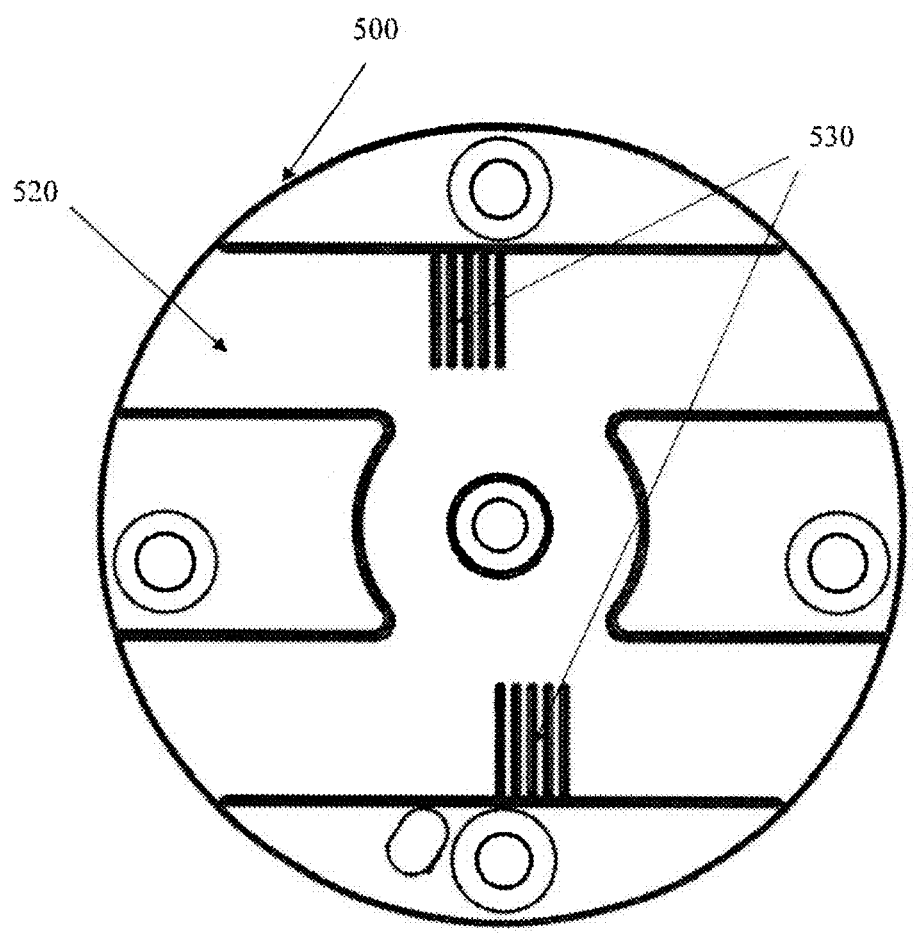
FIG. 7 shows a close-up view of the top plate bottom surface.

FIG. 5 shows a bottom view of bracket 10 with various components removed to show the internal components of the bracket 10. In the view of FIG. 5, bottom plate 600, first bracket arm 100, second bracket arm 200, third bracket arm 300, fourth bracket arm 400, and gear 700 have been removed. Top plate 500 and the second gear 800 are visible. As shown, the axis of rotation for gear 800 is located on the center point of top plate 500. FIG. 5 also shows the ridges 530 that are included within channels 540 for engaging with corresponding ridges of corrugated surfaces 330, 430 of bracket arms 300, 400 when the lock 1000 is in the locked state FIG. 7 shows a bottom view of top plate 500 with gear 800 removed. In the view of FIG. 7, a central recess of the top plate bottom surface 520 in which gear 800 can be nested is seen.

Figure 8:
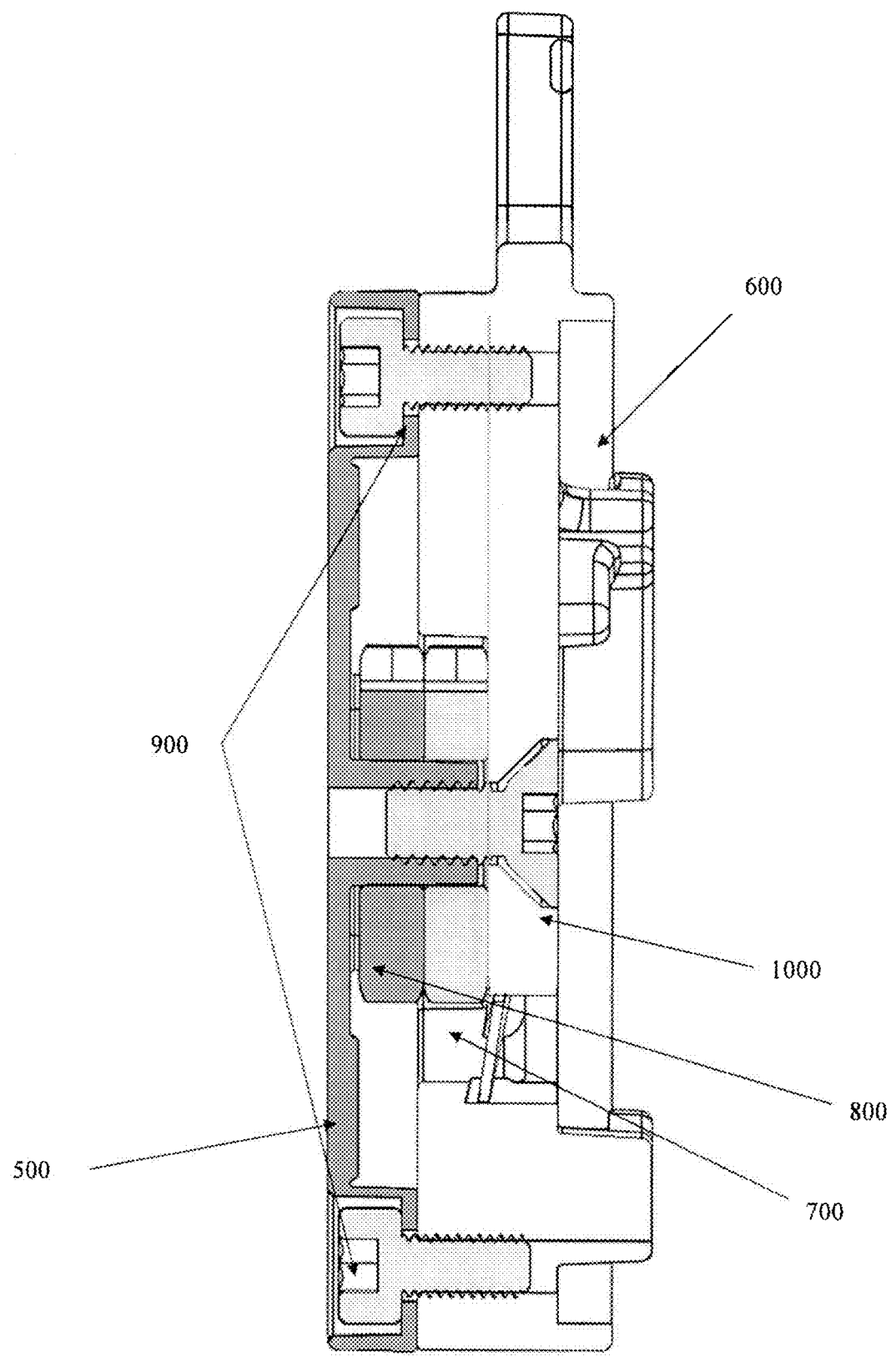
FIG. 8 shows a cross-sectional view of an example bracket.

FIG. 8 shows a cross-sectional view of bracket 10. Cross-sectional views of fasteners 900, top plate 500, bottom plate 600, gears 700 and 800, and lock 1000 are visible. As shown in FIG. 8, the top plate 500 and bottom plate 600 are held together via fasteners 900, as well as the lock 1000. The fasteners 900 connect the top and bottom plates 500 and 600, while the lock 1000 may be locked and unlocked. In the unlocked state, the lock 1000 may be positioned to produce sufficient separation between the top plate 500 and bottom plate 600 that frees extension/retraction of the bracket arms 100, 200, 300, 400. In the locked state, the lock 1000 is positioned to produce a tighter fit between the top plate 500 and bottom plate 600 so that the plates 500/600 apply force/friction to the bracket arms 100, 200, 300, 400 that prevent their extension/retraction. The engagement between fasteners 900, top plate 500 and bottom plate 600 can include a tolerance gap that provides the plates 500, 600 with sufficient flexibility for pressing against each other to block extension/retraction of the bracket arms 100, 200, 300, 400 when the lock 1000 is in the locked position and sufficiently releasing from each other to permit extension/retraction of the bracket arms 100, 200, 300, 400 when the lock 1000 is in the unlocked position (albeit where top and bottom plates 500, 600 remain connected to each other when the lock 1000 is in the unlocked position).

Figure 9:
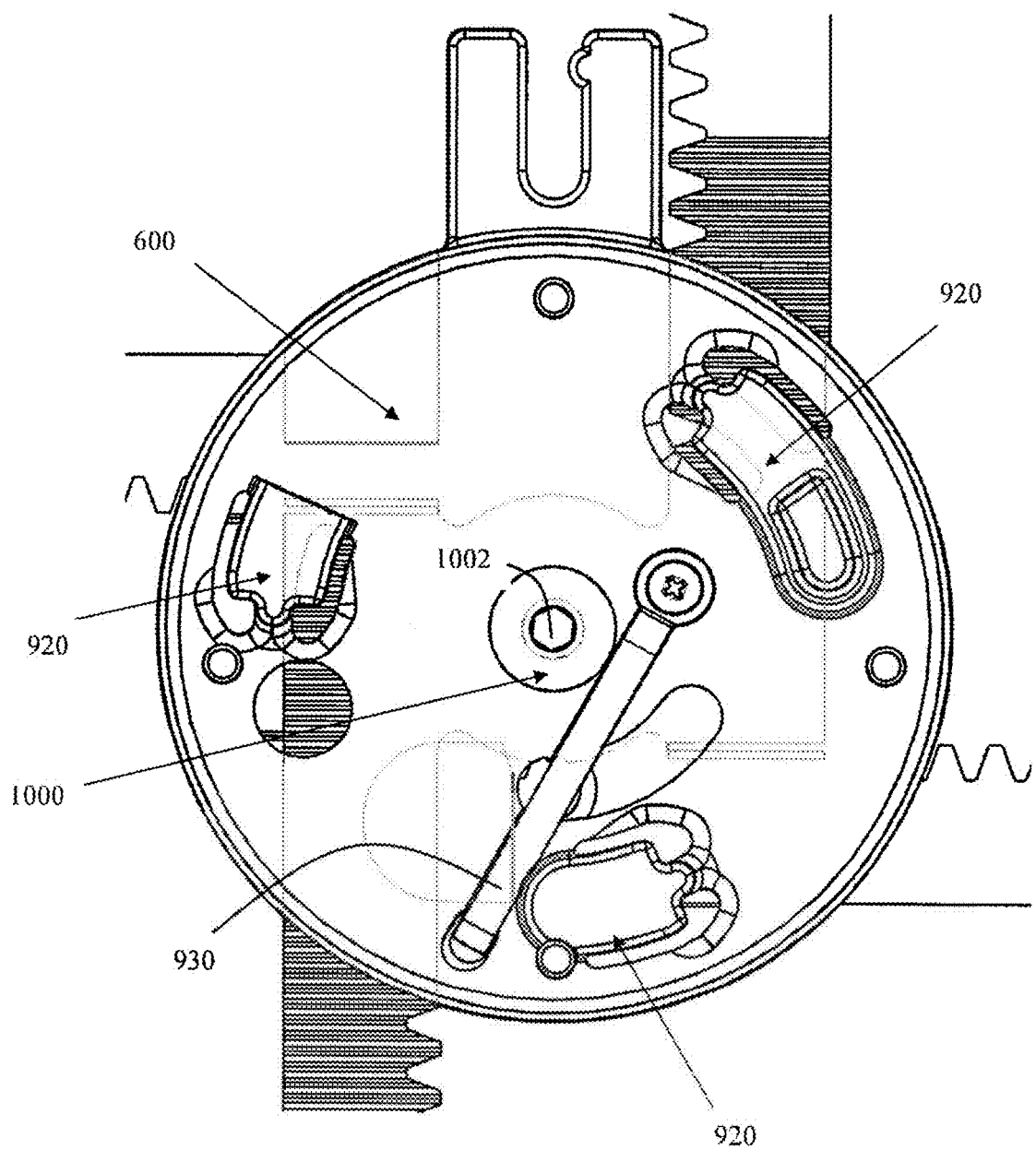
FIG. 9 shows a bottom view of the bottom plate bottom surface.
Figure 10:
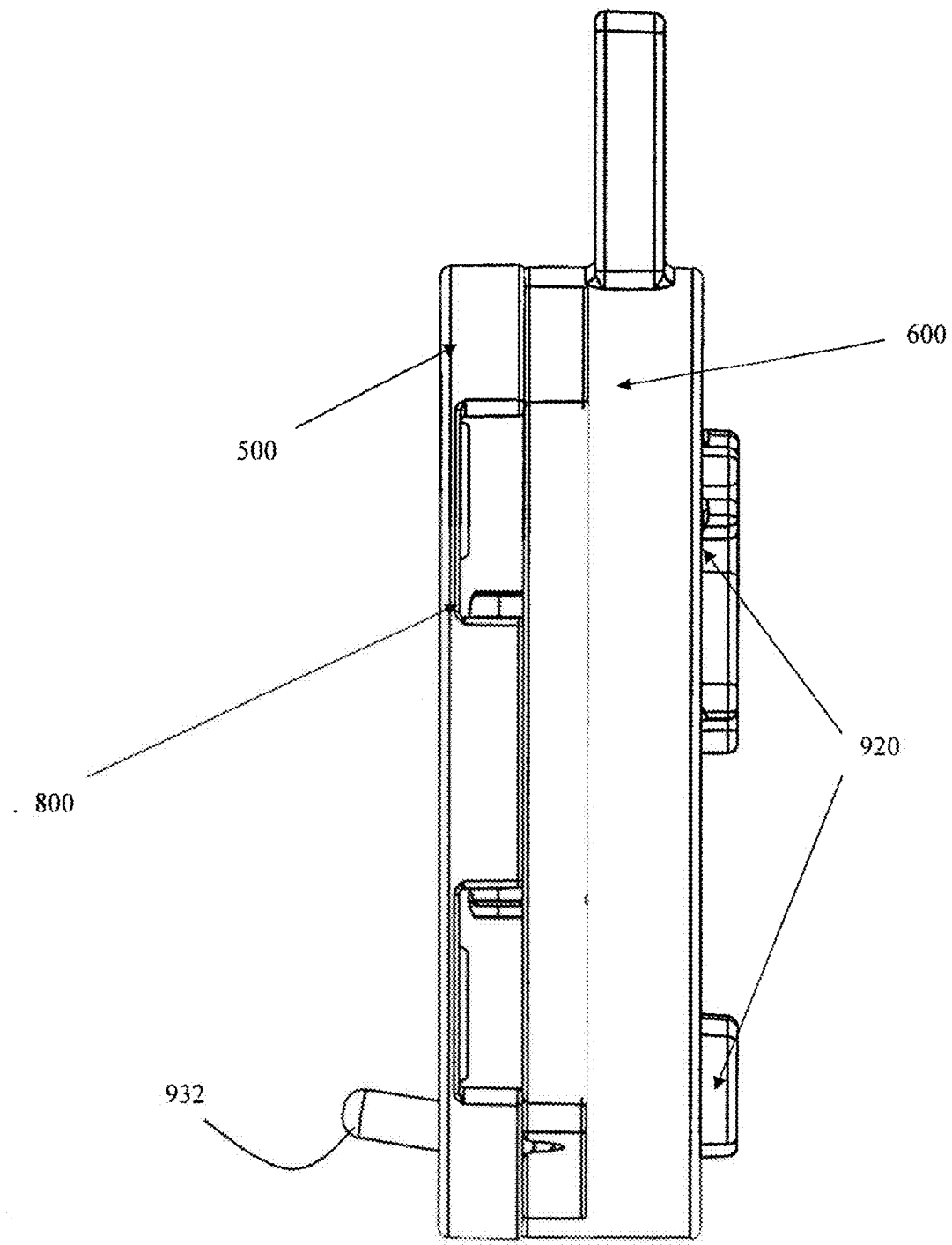
FIG. 10 shows a side-elevation view of an example bracket.

FIG. 9 shows a bottom view of bracket 10. FIG. 10 shows a side-elevation view of the bracket 10. The bottom surface of bottom plate 600 is visible in FIG. 9, as is the interface 1002 for lock 1000. As shown in example of FIG. 9, lock 1000 has an interface 1002 at which a tool may interact with the lock 1000 to engage and disengage the lock 1000. Because the lock 1000 is visible on the bottom plate 600 (though it may be later obscured should a puck be attached to bottom plate 600), only a single interaction is needed to engage or disengage the locking mechanism. e.g., by using a tool to rotate the lock 1000 either clockwise or counterclockwise to engage/disengage the lock 1000.

Figure 11:
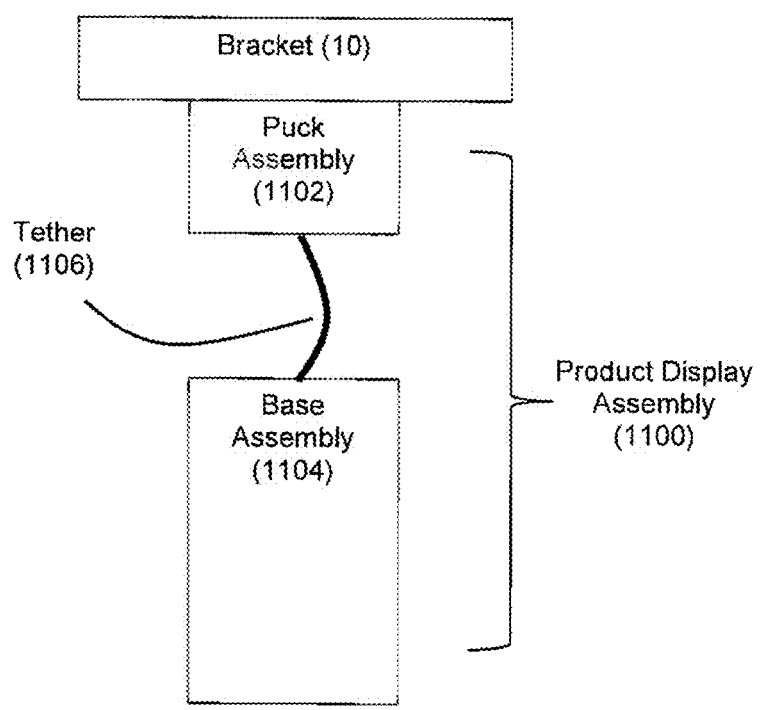
FIG. 11 shows an example where the bracket is secured to a product display assembly.

Bracket 10 can be used in combination with a product display assembly to securely merchandise the product fitted into the bracket. For example, FIG. 11 shows an example where the product display assembly 1100 may include a puck assembly 1102 and a base assembly 1104 as described in, for example, U.S. Pat. Nos. 8,558,688, 8,698,617, 8,698,618, 9,786,140; 10,026,281, U.S. Publication Nos. 2017/0164314, 2017.0300721, 2018/0049563, and 2018/0288721, U.S. application Ser. No. 17/092,804 (filed Nov. 9, 2020, entitled "Product Merchandising System with High Security Features") as well as U.S. provisional patent application 62/807,636 (filed Feb. 19, 2019, entitled "Product Merchandising Display System"), 62/881,175 (filed Jul. 31, 2019, entitled "High Security Product Merchandising System"), 62/929,330 (filed Nov. 1, 2019, entitled "Enhanced Security Product Merchandising System"), the entire disclosures of each of which are incorporated herein by reference. Bracket 10 can be secured to the puck assembly 1102 of a product display assembly to provide additional levels of security.

In an example embodiment, the bottom surface of bottom plate 600 can include mechanisms that provide for modular attachment to and modular detachment from the puck assembly 1102. For example, see puck mounting surfaces 920 as shown by FIGS. 9 and 10. Puck mounting surfaces 420 may take the form of multiple tongues and grooves which can be included on the bottom surface of bottom plate 600. The tongues and grooves can engage with corresponding tongues and grooves on a portion of the puck assembly (e.g., see FIG. 27 of U.S. application Ser. No. 17/092,804) to permit detachable connection of the bracket 10 to the puck assembly 1102. These tongues/grooves thus allow the puck to be attached to the bottom plate 600 through a screwing or twisting action. With this example, less than one full turn of the puck and/or bracket 10 relative to each other can be used to securely attach the bracket 10 with a puck assembly 1102 in such a manner, and the bracket 10 may likewise be removed from the puck assembly 1102 through a screwing or twisting action in the opposite direction. Bottom surface of bottom plate 600 can include a recess locking a modular component onto the puck assembly. Thus, the bracket 10 secures a product, which is restrained on the top plate top surface 510 by bracket arms 100, 200, 300, 400, and the puck assembly 1102 connects to the bottom plate 600. The puck assembly 1102 can be connected to the base assembly 1104 via a retractable tether 1106 as shown by FIG. 11. The retractable tether 1106 allows customers to lift the product away from the base assembly 1104 and to interact with the product in order to facilitate a purchase decision.

FIG. 9 also shows a bar 930 that can be used as part of a bracket product sensor that detects the presence or absence of a product mounted on the bracket 10 and is capable of communicating that presence of absence to security circuitry in the product display assembly to which the bracket is secured. This security circuitry can be configured to trigger an alarm if a product is removed from the product display assembly in an unauthorized manner. For example, with a product display assembly 1100 that includes a puck assembly 1102 on which the bracket 10 may be secured (as shown by FIG. 11), it is known for the puck assembly 1102 to include-a security sensor such as a plunger sensor that is depressed when a product is mounted on the puck assembly. Removal of the product from the puck assembly 1102 will cause a plunger pin of the plunger sensor to be released upward, which is detected by the security circuitry and can trigger an alarm if the security circuitry is armed. Bar 930 can serve as a plunger pass-through sensor that communicates the presence (or absence) of a product on top plate top surface 510 of bracket 10 to the plunger pin of the puck assembly 1102 to which the bracket 10 may be secured. In this fashion, the bracket product sensor is configured for coordinated operation with a security sensor of the product display assembly so that security circuitry within the product display assembly can determine whether a product is mounted on bracket 10 when bracket 10 is secured to the product display assembly.

As shown by FIG. 2, bar 930 can include an end portion 932 that is angled upward. Furthermore, components of bracket 10 such as top plate 500 and/or bottom plate 600 (e.g., see FIG. 4) may include apertures that permit bar 930 and/or end portion 932 to pass through. For example, as shown by FIGS. 1 and 10, bar 930 can be biased so that the end portion 932 extends above the top plate top surface 510 when no product is mounted on top plate top surface 510. When the bar 930 is in this position, it does not apply any force to the plunger sensor of the puck assembly 1102 to which the bracket 10 is secured. When a product is then mounted on top plate top surface 510, this will push end portion 932 downward, which in turn translates into downward motion for bar 930 so that bar 930 presses downward on the plunger pin of the puck assembly 1102 (whereupon product presence can be registered by the security circuitry of the product display assembly 1100). If the product is removed from bracket 10, this will cause bar 930 to return upward, thereby releasing the plunger sensor and causing the security circuitry to register the absence of the product. Alarms can be triggered if the security circuitry is armed when this occurs.

The above figures, either in combination or separately, also disclose a method for using the bracket 10 depicted in the figures. An example method in this regard follows.

First, the lock 1000 is controlled via the interface 1002 so that it is in an unlocked state. This permits movement of the first, second, third, and fourth bracket arms 100, 200, 300, and 400. A pulling force is used on either the first or second bracket arm 100 or 200 to extend the bracket arms 100 and 200 wide enough to accommodate a product placed on the top plate top surface 510 of the top plate 500. Similarly, another pulling force is applied to either the third or fourth bracket arm 300 or 400 to extend the bracket arms 300 and 400 wide enough that the product can be placed on the top plate top surface 510 of the top plate 500. The order of which bracket arms are pulled first does not matter. Only one each of the first/second bracket arms and the third/fourth bracket arms need to be pulled to extend the pair of arms because, as discussed above, the connection of the pair of arms to the same gear allows the first/second and the third/fourth bracket arms to extend as a pair. But, because the first/second bracket arm pair and the third/fourth bracket arm pair are on separate gears, two pulling forces are needed to extend the bracket arms. With the bracket arms sufficiently extended, the product is then placed on the top plate top surface 510 of the top plate 500. Then, a pushing force is applied to either the first or second bracket arms 100, 200, and either the third or fourth bracket arms to retract the bracket arms 100, 200, 300, 400 into a snug fit on the product. Once again, only one of each of the first/second bracket arms and the third/fourth bracket arms need to be pushed retract the pair of arms because, as discussed above, the connection of the pair of arms to the same gear allows the first/second and the third/fourth bracket arms to retract as a pair. But, because the first/second bracket arm pair and the third-fourth bracket arm pair are on separate gears, two pushing forces are needed to retract the bracket arms. Once all bracket arms have been retracted and the product is secured within the bracket arms, the lock 1000 is then locked to prevent further extensions of the bracket arms. At this point, the product is secured in the bracket 10. It should be noted that, due to the automatic centering function of each pair of bracket arms that, once this method is performed, the device will be centered on the top plate top surface 510.

While the invention has been described above in relation to its example embodiments, various modifications may be made thereto that still fall within the invention's scope. For example, while the drawings show a bracket 10 where the bracket arms are adjustable in perpendicular directions, it should be understood that only one pair of the bracket arms may adjustable if the products to be secured will have variances along only a single dimension. In such a scenario, only one of the gears 700, 800 would be needed. These and other modifications to the invention will be recognizable upon review of the teachings herein. Thus, the breadth and scope of the present invention should not be limited by any of the above-described example embodiments, but should be defined only in accordance with the following claims appended hereto and their equivalents.

The invention claimed is:
1. An apparatus comprising:
   an adjustable bracket for securing a product, the bracket comprising:
      a first bracket arm;
      a second bracket arm; and
      a base comprising a top plate, a bottom plate, a gear located between the top plate and the bottom plate, and a lock that is controllable between a locked state and an unlocked state,
   wherein the first and second bracket arms extend laterally outward from opposite sides of the base,
   wherein the top plate includes a top plate top surface and a top plate bottom surface,
   wherein the bottom plate includes a bottom plate top surface,
   wherein the gear is located between the top plate bottom surface and the bottom plate top surface,
   wherein the lock comprises a tension lock that when in the locked state, compresses the top plate and the bottom plate together to restrict further extension of the first and second bracket arms relative to the base, and when in the unlocked state, loosens the top plate and the bottom plate relative to each other to permit further extension and/or retraction of the first and second bracket arms relative to the base, and wherein the gear, when the tension lock is in the unlocked state, is rotatable in a first rotational direction to drive a lateral extension of the first and second bracket arms relative to the base and rotatable in a second rotatable direction to drive a lateral retraction of the first and second bracket arms relative to the base.

2. The apparatus of claim 1 wherein the first and second bracket arms are shaped for securing the product on the top plate top surface when adjusted via the gear to fit a dimension of the product.

3. The apparatus of claim 1 wherein the gear comprises a plurality of gear teeth, wherein a portion of the first bracket arm comprises a plurality of first bracket arm teeth, wherein a portion of the second bracket arm comprises a plurality of second bracket arm teeth, and wherein a plurality of the gear teeth engage with a plurality of the first bracket arm teeth and a plurality of the second bracket arm teeth so that rotation of the gear drives the first and second bracket arms outward or inward.

4. The apparatus of claim 1 wherein the first bracket arm engages with a part of the gear that is opposite a part of the gear that engages with the second bracket arm.

5. The apparatus of claim 1 wherein the first and second bracket arms are sized and engage with the gear so that a center point of the bracket remains the same for any extension or retraction of the first and second bracket arms.

6. The apparatus of claim 1 wherein the gear, when the lock is in the unlocked state, is rotatable in response to a pulling or pushing force applied to the first bracket arm or the second bracket arm.

7. The apparatus of claim 1 wherein the first and second bracket arms each comprise ridged surface portions, wherein the top plate bottom surface and/or the bottom plate top surface comprise ridged surface portions; and
    wherein the compression of the top plate and the bottom plate together causes an engagement between the ridged surface portions of the first and second bracket arms and the ridged surface portions of the top plate bottom surface and/or the bottom plate top surface that restricts extension of the first and second bracket arms relative to the base.

8. The apparatus of claim 1 wherein the bracket comprises:
    a third bracket arm; and
    a fourth bracket arm,
    wherein the base comprises a second gear located between the top plate bottom surface and the bottom plate top surface,
    wherein the third and fourth bracket arms extend laterally outward from opposite sides of the base in different directions than the first and second bracket arms,
    wherein the tension lock when in the locked state, compresses the top plate and the bottom plate together to restrict further extension of the third and fourth bracket arms relative to the base, and when in the unlocked state, loosens the top plate and the bottom plate relative to each other to permit further extension and/or retraction of the third and fourth bracket arms relative to the base, and
    wherein the second gear, when the tension lock is in the unlocked state, is rotatable in the first rotational direction to drive a lateral extension of the third and fourth bracket arms relative to the base and rotatable in the second rotatable direction to drive a lateral retraction of the third and fourth bracket arms relative to the base.

9. A product display assembly comprising:
    an adjustable bracket for securing a product, the bracket comprising:
        a first bracket arm;
        a second bracket arm;
        a third bracket arm;
        a fourth bracket arm;
        a base comprising a top plate, a bottom plate, a first gear located between the top plate and the bottom plate, a second gear located between the top plate and the bottom plate, and a lock that is controllable between a locked state and an unlocked state;
    a puck assembly connected to the bracket; and
    a base assembly on which the puck assembly can be rested and lifted, wherein the bracket is detachably connectable with the puck assembly,
    wherein the first and second bracket arms serve as a first pair of bracket arms that extend laterally outward from opposite sides of the base along a first dimension,
    wherein the third and fourth bracket arms serve as a second pair of bracket arms that extend laterally outward from opposite sides of the base along a second dimension,
    wherein the top plate includes a top plate top surface and a top plate bottom surface,
    wherein the bottom plate includes a bottom plate top surface,
    wherein the first and second gears share a common axis of rotation and are located between the top plate bottom surface and the bottom plate top surface,
    wherein the lock permits further extension and retraction of the first and second pairs of bracket arms when in the unlocked state, and wherein the lock prevents further extension of the first and second pairs of bracket arms when in the locked state,
    wherein the first gear, when the lock is in the unlocked state, is rotatable in a first rotational direction to drive a lateral extension of the first pair of bracket arms relative to the base and rotatable in a second rotatable direction to drive a lateral retraction of the first pair of bracket arms relative to the base,
    wherein the second gear, when the lock is in the unlocked state, is rotatable in the first rotational direction to drive a lateral extension of the second pair of bracket arms relative to the base and rotatable in the second rotatable direction to drive a lateral retraction of the second pair of bracket arms relative to the base, and
    wherein the lock comprises a tension lock that when in the locked state compresses the top plate and the bottom plate together to restrict further extension of the first and second pairs of bracket arms relative to the base, and when in the unlocked state loosens the top plate and the bottom plate relative to each other to permit further extension and/or retraction of the first and second pairs of bracket arms relative to the base.

10. The product display assembly of claim 9 wherein the first and second pairs of bracket arms are shaped for securing the product on the top plate top surface when adjusted via the first and second gears to fit first and second dimensions of the product.

11. The product display assembly of claim 9 wherein the first gear comprises a plurality of first gear teeth, wherein a portion of the first bracket arm comprises a plurality of first bracket arm teeth, wherein a portion of the second bracket arm comprises a plurality of second bracket arm teeth, and wherein a plurality of the first gear teeth engage with a plurality of the first bracket arm teeth and a plurality of the second bracket arm teeth so that rotation of the first gear will drive the first and second bracket arms outward or inward; and wherein the second gear comprises a plurality of second gear teeth, wherein a portion of the third bracket arm comprises a plurality of third bracket arm teeth, wherein a portion of the fourth bracket arm comprises a plurality of fourth bracket arm teeth, and wherein a plurality of the second gear teeth engage with a plurality of the third bracket arm teeth and a plurality of the fourth bracket arm teeth so that rotation of the second gear will drive the third and fourth bracket arms outward or inward.

12. The product display assembly of claim 9 wherein the first bracket arm engages with a part of the first gear that is opposite a part of the first gear that engages with the second bracket arm, and wherein the third bracket arm engages with a part of the second gear that is opposite a part of the second gear that engages with the fourth bracket arm.

13. The product display assembly of claim 9 wherein the first pair of bracket arms and the second pair of bracket arms are sized and engage with the first and second gears respectively so that a center point of the bracket remains the same for any extension or retraction of the first and second pairs of bracket arms.

14. The product display assembly of claim 9 wherein the first gear, when the lock is in the unlocked state, is rotatable in response to a pulling or pushing force applied to the first bracket arm or the second bracket arm; and wherein the second gear, when the lock is in the unlocked state, is rotatable in response to a pulling or pushing force applied to the third bracket arm or the fourth bracket arm.

15. The product display assembly of claim 9 wherein the first and second bracket arms each comprise ridged surface portions, wherein the third and fourth bracket arms each comprise ridged surface portions, wherein the top plate bottom surface and the bottom plate top surface each comprise ridged surface portions; and wherein the compression of the top plate and the bottom plate together causes an engagement between the ridged surface portions of the first, second, third, and fourth bracket arms and the ridged surface portions of the top plate bottom surface and the bottom plate top surface that restricts extension of the first, second, third, and fourth bracket arms relative to the base.

16. The product display assembly of claim 9 wherein the bracket includes a single lock interface for interacting with the lock to switch the lock between the locked state and the unlocked state and the single lock interface is located on a bottom surface of the bottom plate.

17. A method of using a bracket for securing a product to a product display assembly, the method comprising:

adjusting a bracket attached to a puck assembly of a product display assembly by extending a first bracket arm and a second bracket arm located between a first plate and a second plate such that the first and second bracket arms define a dimension that is larger than a corresponding dimension of the product;

placing the product in the adjusted bracket;

retracting the first and second bracket arm until the first and second bracket arms secure the product; and controlling a lock via a single lock interface of the bracket to change the lock from an unlocked state to a locked state, wherein extending the first and second bracket arms rotates a gear in a first direction, wherein retracting the first and second bracket arms rotates the gear in a second direction, wherein the locking step comprises preventing rotation of the gear that would cause the first and second bracket arms to extend, and wherein controlling the lock via the single lock interface comprises compressing the top plate and the bottom plate together to restrict further extension of the first and second bracket arms, and loosening the top plate and the bottom plate relative to each other to permit extension and/or retraction of the first and second bracket arms.

18. The method of claim 17 wherein the first and second bracket arms automatically center the product on the adjustable bracket.

19. The method of claim 17 wherein the adjusting step further comprises:

extending a third bracket arm and a fourth bracket arm located between the first plate and the second plate such that the third and fourth bracket arms define another dimension that is larger than another corresponding dimension of the product, retracting the third and fourth bracket arm until the third and fourth bracket arms secure the product; and wherein extending the third and fourth bracket arms rotates a second gear in the first direction, wherein the another dimension defined by the third and fourth bracket arms is orthogonal to the dimension defined by the first and second bracket arms, wherein retracting the third and fourth bracket arms rotates the second gear in the second direction, and wherein controlling the lock via the single lock interface comprises compressing the top plate and the bottom plate together to restrict further extension of the third and fourth bracket arms, and loosening the top plate and the bottom plate relative to each other to permit extension and/or retraction of the third and fourth bracket arms.

* * * * *